United States Patent [19]

David

[11] Patent Number: 5,104,966
[45] Date of Patent: Apr. 14, 1992

[54] POLYIMIDE INSULATION WITH IMPROVED ARC TRACK RESISTANCE

[75] Inventor: Harris B. David, Landenberg, Pa.

[73] Assignee: E. I. Du Pont de Nemours and Company, Wilmington, Del.

[21] Appl. No.: 365,395

[22] Filed: Jun. 13, 1989

[51] Int. Cl.$^5$ .................. C08C 69/26; C08C 14/00; C08C 8/02

[52] U.S. Cl. .................. 528/310; 528/125; 528/128; 528/170; 528/172; 528/173; 528/188; 528/206; 528/208; 528/229; 528/322; 528/330; 528/350; 528/353; 428/473.5

[58] Field of Search ............ 528/125, 128, 170, 172, 528/173, 188, 206, 208, 229, 310, 322, 330, 350, 353

[56] References Cited

U.S. PATENT DOCUMENTS

| | | | |
|---|---|---|---|
| 3,424,718 | 1/1969 | Angelo | 528/28 |
| 3,551,200 | 12/1970 | Stivers | 117/232 |
| 3,677,921 | 7/1972 | Stivers | 204/159.19 |
| 3,803,103 | 4/1974 | Magay | 428/379 |
| 4,413,115 | 11/1983 | Nimry et al. | 528/188 |
| 4,417,045 | 11/1983 | Nimry et al. | 528/188 |
| 4,431,791 | 2/1984 | Nimry et al. | 528/188 |
| 4,438,256 | 3/1984 | Ohta et al. | 528/188 |

FOREIGN PATENT DOCUMENTS

| | | |
|---|---|---|
| 60-177660 | 2/1984 | Japan . |
| 60-140201 | 3/1985 | Japan . |
| 62001726 | 6/1985 | Japan . |

OTHER PUBLICATIONS

A New Extruded Alkane-Imide Wire by V. L. Lanza and R. M. Halperin-Dec. 1969.

Primary Examiner—John Kight, III
Assistant Examiner—P. Hampton-Hightower

[57] ABSTRACT

Novel polyimide based films are disclosed that are resistant to arc tracking and that include aromatic dianhydrides together with aromatic diamines and aliphatic diamines. The compositions contain from 5 to 20 percent by weight of the aliphatic diamine. These compositions maximize the thermal aging capability of the polyimide. The compositions are useful as films and laminates for wire and cable.

11 Claims, 1 Drawing Sheet

FIGURE

POLYIMIDE INSULATION WITH IMPROVED ARC TRACK RESISTANCE

FIELD OF THE INVENTION

This invention relates to polyimide insulation having desirable physical properties. More particularly, this invention relates to copolyimide films, coated copolyimide films, and copolyimide laminates of aromatic tetracarboxylic acids, aromatic diamines, and aliphatic diamines, which exhibit superior arc tracking resistance and thermal aging stability.

BACKGROUND OF THE INVENTION

Polyimide film is useful in a variety of applications, because it has excellent chemical resistance and mechanical properties throughout a wide range of temperatures. These and other properties make polyimide film particularly suitable as insulation for the protection of power and signal wire. However, during installation, maintenance or service, insulation on one or more wires installed as a bundle may become damaged by chafing, chemical contact, or other means in a way that exposes the conductor. Electrical arcing can occur when the conductor of a damaged wire in the bundle comes into contact with another conductor or a grounded surface. The resulting short-circuit and subsequent reenergizing of the wire may cause further electrical arcing which produces localized areas of very high temperatures. Rapid thermal degradation of the insulation material may then occur. This degradation is called "arc tracking" (also commonly referred to as arc propagation), wherein electrical arcing is perpetuated throughout the insulation material. The arc tracking may damage the electrical system. Arc track resistant polyimide insulation does not propagate damage caused by this type of event.

U.S. Pat. No. 3,424,718 to Angelo concerns a copolyimide of an aromatic tetracarboxylic acid and at least three different diamines, two of said diamines being aromatic diamines and the other of said diamines being an aryl aliphatic diamine having an alkylene group. However, this reference does not disclose copolyimides containing aliphatic diamines as having arc track resistance.

U.S. Pat. No. 3,551,200 and related U.S. Pat. No. 3,677,921 to Stivers relate to thermoplastic polyimides of straight chain alkylene diamines and pyromellitic anhydride for use in wire insulation and film as a base for printed circuits However, these references do not describe copolyimides as having the unique combination of arc track resistant properties and thermal aging stability as in the present invention.

U.S. Pat. No. 3,803,103 to Magay is directed to copolyimides derivable from straight chain and branched chain diamines and tetracarboxylic acid moieties and used as electrical insulation. However, this reference does not reveal a composition as having arc track resistance.

Thus, there is a need for polyimide based insulating materials that are not susceptible to arc tracking. Such materials would preferably additionally exhibit the desirable mechanical properties and chemical resistance characteristic of polyimides. Moreover, such compositions must be readily formable as protective laminates, films, or coatings.

It is an object of the present invention to provide a polyimide based film that exhibits arc track resistance. It is a further object of this invention to provide a polyimide based film that has good heat aging stability. A still further object of this invention is to provide a polyimide based composition that substantially retains the beneficial properties of the polyimide, including tensile strength, elongation, and other properties. A feature of the present invention is the unique combination of aromatic and aliphatic diamines together with an aromatic dianhydride to furnish a copolyimide exhibiting these properties. An advantage of the present polyimide based film is that it can be formed as a laminate around power cable and wire to provide a protective arc track resistant sheath. These and other objects, features, and advantages will become readily apparent from the following description of the invention.

SUMMARY OF THE INVENTION

According to this invention, there is provided an improved copolyimide film of (a) an aromatic tetracarboxylic acid; and (b) at least one aromatic diamine; the improvement comprising the addition of (c) at least one aliphatic diamine, wherein the aliphatic diamine is present from 5 to 20 percent by weight based on components (a), (b) and (c), and wherein said copolyimide film is arc track resistant. By components it is meant those components which are allowed to react to form the polyimide film.

A particular aspect of this invention discloses an arc track resistant copolyimide film of pyromellitic acid, 4,4'-diaminodiphenylether, and 1,6-diaminohexane.

Also disclosed according to this invention is a process for the application of an arc track resistant copolyimide film to a substrate, comprising (a) contacting said polyimide film with a fluoropolymer dispersion to form a coated copolyimide film; (b) heating said coated copolyimide film to adhere said fluoropolymer dispersion to said copolyimide film; (c) applying said coated copolyimide film to a substrate; and (d) heating said coated copolyimide film together with said substrate to adhere said coated copolyimide film to itself.

DETAILED DESCRIPTION OF THE INVENTION

The phenomenon of "arc tracking" is a recognized failure mode of insulation materials, wherein electrical arcing is perpetuated along the surface and through the material that insulates conductors such as power cable and wire. Without intending to be bound by any particular theory, it is believed that the mechanism of arc tracking is related to the degradation of regions of the insulation material due to the high temperature of an electrical arc which can form a conductive carbon char. The degradation of regions of the insulation to a carbonaceous char perpetuates the arc when cable or wire is reenergized and aggravates the resulting damage due to its electrically conductive nature. While a carbonaceous char is advantageous in that it serves as a barrier to protect wire or cable beneath the char from the adverse effects of fire, it unfortunately does not inhibit further propagation or tracking of the arc. In contrast, arc track resistant materials do not appreciably perpetuate the damage caused by initial electrical arcing. Such materials exhibit minimal degradation upon exposure to an electrical arcing event, and arrest the progress of arc tracking as energy is reapplied to the power cable and wire. Arc tracking is a particularly acute problem in systems of power and signal wire that are installed in bundles or harnesses, because several wires are in intimate contact with one another. In such systems, damage to the insulation of a wire or a set of wires due to initial electrical arcing may propagate to previously undamaged insulation (on the same wire or other wires) when the damaged regions of the insulation exhibit arc tracking behavior.

The compositions of the present invention are particularly useful as insulation for wire and cable used in conditions where extreme environments are encountered. An example of such a use is in aircraft wiring where environmental extremes, extensive lifecycles, and rigorous mechanical requirements exist. If electrical arcing occurs along power and signal wire in aircraft, it is common practice to reenergize the circuit one time. Insulation material with a propensity to arc track will resume electrical arcing when the wiring is reenergized, and attendant sparks, heat and possibly flame can perpetuate additional damage to the damaged wire and surrounding wires and insulation. In such an event, the circuit breaker may trip and deenergize the system. With arc track resistant material, once the circuit is reenergized only short duration sparking will at most occur. Arc tracking is not evidenced and the system (with the exception of the damaged circuit) continues to function.

Without intending to be bound by any particular theory, it is believed that the key to the arc track resistant behavior of the present insulation is related to the level of aliphatic diamine in the composition. It has been discovered that using a particular range of weight percent of aliphatic diamine in the polyimide modifies the degradation mechanism, promoting arc track resistance. If levels of aliphatic diamine below this range are present in the polyimide, then during a short circuit and with power applied to the wire, continued violent degradation of the insulation occurs with damage to surrounding wires occasionally accompanied by flaming. If levels of aliphatic diamine above this range are present in the polyimide, then the composition has poor thermal stability.

An important feature of the present invention is the intricate balance of arc track resistant properties with mechanical properties. Thus, the claimed compositions largely retain the desirable properties of the base polyimide (including heat aging stability, excellent tensile properties, excellent life cycle data, and good burning properties as measured by information such as limiting oxygen index and smoke output) and in addition are arc track resistant. As a general rule, the introduction of aromatic precursors to polyimides promotes arc tracking in the composition, but simultaneously enhances the thermal and oxidative stability of the composition. Conversely, the addition of aliphatic diamines to polyimides generally reduces thermal stability but simultaneously enhances the arc track resistance of the composition. The compositions of the present invention have achieved an intricate balance in retaining the beneficial properties of both the aromatic components and the aliphatic diamines, while suppressing the deleterious properties that these components add to a polyimide composition.

Tetracarboxylic acids that are useful for the present compositions include the following:
pyromellitic acid
2,3,6,7-naphthalene tetracarboxylic acid
1,2,5,6-naphthalene tetracarboxylic acid
2,2',3,3'-diphenyl tetracarboxylic acid
3,3',4,4'-diphenyl tetracarboxylic acid
2,2-bis(3,4-dicarboxyphenyl)propane
bis(3,4-dicarboxyphenyl)sulfone
bis(3,4-dicarboxyphenyl)ether
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,7-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
pyrazine-2,3,5,6-tetracarboxylic acid
2,2-bis(2,3-dicarboxyphenyl)propane
1,1-bis(2,3-dicarboxyphenyl)ethane
1,1-bis(3,4-dicarboxyphenyl)ethane
bis(2,3-dicarboxyphenyl)methane
bis(3,4-dicarboxyphenyl)methane
bis(3,4-dicarboxyphenyl)sulfone
benzene-1,2,3,4-tetracarboxylic acid
thiophene-2,3,4,5-tetracarboxylic acid
3,4,3',4,'-benzophenone tetracarboxylic acid
2,3,2,'3,'-benzophenone tetracarboxylic acid
2,3,3',4,'-benzophenone tetracarboxylic acid Acid dianhydrides, esters, and salts of these tetracarboxylic acids may also be employed.

The aromatic diamines that are contemplated as within the scope of the present invention include the following:
meta-phenylene diamine
para-phenylene diamine
2,2-bis(4-aminophenyl)propane
4,4'-diaminodiphenyl methane
4,4'-diaminodiphenyl sulfide
4,4'-diaminodiphenyl sulfone
3,3'-diaminodiphenyl sulfone
4,4'-diaminodiphenyl ether
2,6-diaminopyridine
bis(4-aminopnenyl)diethyl silane
bis(4-aminophenyl)diphenyl silane benzidine
3,3'-dichlorobenzidine
3,3'-dimethoxybenzidine
bis(4-aminophenyl)ethyl phosphine oxide
4,4'-diaminobenzophenone
bis(4-aminophenyl)phenyl phosphine oxide
bis(4-aminophenyl)-N-butylamine
bis(4-aminophenyl)-N-methylamine
1,5-diaminonaphthalene
3,3'-dimethyl-4,4'-diaminobiphenyl
N-(3-aminophenyl)-4-aminobenzamide
4-aminophenyl-3-aminobenzoate
2,4-bis(beta-amino-t-butyl)toluene
bis(p-beta-amino-t-butylphenyl)ether
p-bis(2-methyl-4-aminopentyl)benzene
p-bis(1,1-dimethyl-5-aminopentyl)benzene
o-xylylene diamine
m-xylylene diamine
p-xylylene diamine
bis(4-aminophenyl)-N-phenylamine Aliphatic or cycloaliphatic diamines useful in the present invention include the following:
3-methylheptamethylene diamine
5-methylnonamethylene diamine
heptamethylene diamine
octamethylene diamine
nonamethylene diamine decamethylene diamine
tetramethylene diamine
hexamethylene diamine
pentamethylene diamine
2,2-dimethylpropylene diamine
1,1,3-trimethylpropylene diamine
1,1,6,6-tetramethylhexamethylene diamine
3,3-dimethylpentamethylene diamine
3-methylhexamethylene diamine
3-methoxyhexamethylene diamine
2,5-dimethylhexamethylene diamine
2,2,5,5-tetramethylhexamethylene diamine
bis-(3-aminopropyl)-ether
1,2-bis-(3-aminopropoxy)ethane
1,2-bis-(3-aminopropoxy)propane
4,4-dimethylheptamethylenediamine
4,4'-bis(aminocyclohexyl)methane
1,6-diaminohexane
1,12-diaminododecane
1,5-diamino-2-methylpentane
1,5-diaminopentane
1,4-diaminobutane The copolyamide-acid compositions of this invention can be readily prepared by reacting the essential components as described above in an organic solvent for both the acid and diamine components, the solvent being inert to the reactants, preferably under anhydrous conditions, for a time and at a temperature sufficient to provide a shapeable composition of copolyamide-acid. The acid component may be in the form of the corresponding tetracarboxylic acid dianhydride, as is readily understood. Reaction conditions suitable for this type of reaction are known in the art.

The copolyamide-acid can be readily converted to the corresponding copolyimide by known techniques, including for example heat treatment at temperatures above about 50° C., or chemical treatment with a dehydrating agent such as acetic anhydride alone or in combination with a tertiary amine such as pyridine, or a combination of chemical and heat treatment.

Instead of preparing the copolyimides through the copolyamide-acid route, the copolyimides can be prepared via copolyamide-esters, copolyamide-amides, or other alternative intermediates.

The aliphatic (or cycloaliphatic) diamine may be arranged in a linear or a branched configuration and has from 4 to 13 carbon atoms.

The stoichiometry of the reaction to produce polyimide films is conventional, in that the moles of dianhydride are essentially equal to the sum of the moles of aliphatic diamine plus the moles of aromatic diamine. This is necessary to get high molecular weight in the condensation reaction.

The aliphatic diamine content of the polyimide used in the present invention is from 5 to 20 percent by weight of reactants. A preferred range of aliphatic diamine is from 6 to 15 percent by weight of reactants. Most preferred levels of aliphatic diamine are from 7 to 10 percent by weight of reactants. Levels lower than 5 percent can show instances of arc tracking. Levels of aliphatic diamines above 20 percent do not show arc tracking, however there is an increasing loss of thermal stability (or oxidative thermal aging) as aromatic diamine is replaced with aliphatic diamine.

PROCEDURES

The compositions of the Examples and the Comparative Examples were subjected to a variety of tests that indicate the degree of resistance to arc tracking. Two special tests were devised to evaluate the resistance of a sample of material to arc tracking. In addition, an oven aging test was devised to measure the time required for a sample of a composition to demonstrate brittleness. It should be noted that there are no generally accepted procedures to measure these phenomena; there are no approved industry tests or industry standards.

The first test devised to evaluate sample materials is the "Arc Track Screening" test. This test evaluated samples of materials for propagation of an artificially induced electrical arc.

Figure 1:
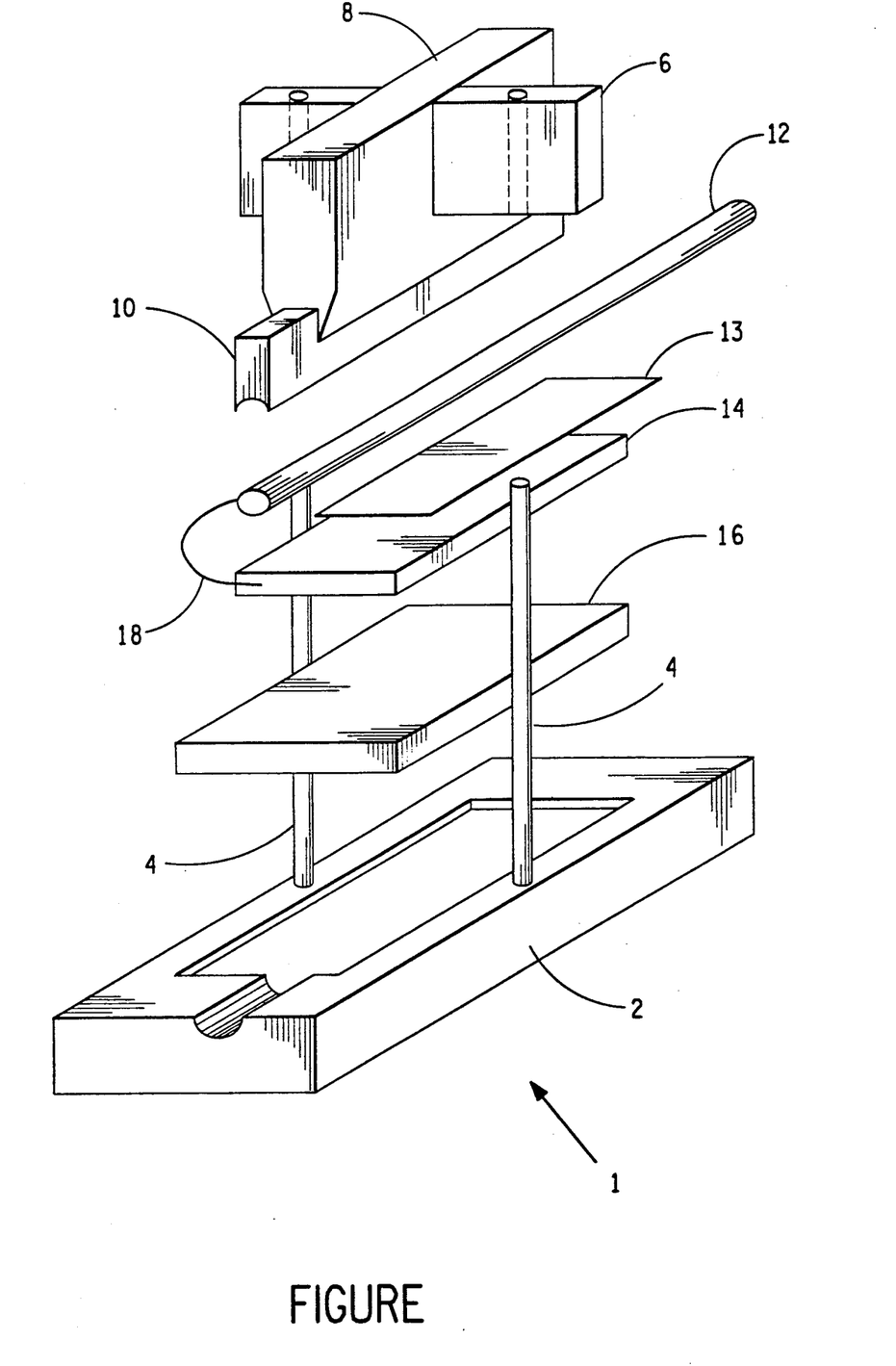
The FIGURE is a perspective view of the test apparatus of the Avc Track Screening Test used to evaluate compositions for arc track behavior.

The equipment used in the Arc Track Screening test is more fully understood with reference to the FIGURE. The test equipment is shown generally at 1 and consists of a holding unit 2 made of nonconductive material (in these experiments, the material was Teflon ®, fluorocarbon resin of E. I. du Pont de Nemours and Company) and having attached thereto posts 4. The posts 4 accommodate block 6 by means of apertures in said block 6 that engage said posts 4. Wedge 8 is moveable longitudinally along the length of the block 6 and contains a nonconductive replaceable bar 10 (in these experiments, Teflon ® fluorocarbon resin was used) on the edge nearest the holding unit 2. The replaceable bar 10 is curved on one edge to accommodate a conductor 12 (a 20 AWG solid copper wire). The test specimen 13 is placed between the conductor 12 and a conductive plate 14, which is made of brass shim stock (0.031" thick×2" wide×6" long). The test specimen 13 is 0.025–0.050 mm thick and formed as either a film or (in instances where a film could not be formed) a coating on a steel coupon. Note that for some compositions both the film and the coating were tested. The conductive plate 14 rests on a support plate 16, which in turn is secured within a recess in the holding unit 2. An initiating strand 18 (a single strand of 19/34 stranded 22 gauge wire, approximately 1 inch in length) connects the conductor 12 to the conductive plate 14.

In operation, the test specimen 13 (in film form) is placed on top of the conductive plate 14 directly below the replaceable bar 10 of the wedge 8. Alternatively, the test specimen 13 was coated on a steel coupon which was placed between the replaceable bar 10 and the conductive plate 14 with the coating facing the replaceable bar 10. The conductor 12 is placed between the test specimen and the replaceable bar 10. The curved edge of the replaceable bar 10 is used to maintain proper alignment of the conductor 12 with the test specimen. The conductor 12 is adjusted to extend beyond one end of the replaceable bar 10 by approximately 1/16". The conductor 12 should not come into contact with the conductive plate 14. One end of a power source (negative) is connected to the conductive plate 14, and the other end of the power source (positive) is connected to the conductor 12. The initiating strand 18 is positioned to bridge the conductor 12 with the conductive plate 14. A 20 AMP circuit breaker is placed in series between the conductive plate 14 and a remote on/off switch of the power source. The power is provided to the system, and the length of damage to the test specimen is measured.

If the test specimen appreciably propagates damage and causes the circuit breaker to trip, the material is considered arc tracking material. No further testing was performed on these specimens. If the test specimen does not appreciably propagate damage or cause the breaker to trip during the first application of power, then the conductor 12 is to be repositioned for a second supply of power to the system. If no further propagation of damage or circuit breaker tripping occurs on the second application of power, the test specimen is considered indicative of arc track resistant material. The notation "yes/no" to describe the breaker trip of a tested sample means that on average, some samples tripped the breaker while others did not. In compositions for which arc track propagation is indicated by an asterisk, the tested samples were judged to be sufficiently arc track resistant as evidenced by the average value of arc propagation.

The second test devised to evaluate sample materials is the "Wire Harness Test". This test evaluated the propensity of a group of wires arranged in a harness to exhibit arc track resistant behavior. The test harness consisted of seven lengths (approximately 18 cm in length) of six 20 or 22 AWG wires insulated with 0.125–0.2 mm of test insulation arranged in a "six-around-one" configuration (one wire was surrounded by the remaining six wires equally spaced from each other). For this test, films of test samples were coated with Teflon ® FEP dispersion (approximately 0.0025 mm in thickness) for sealability and cut into strips suitable for wrapping around the wires. Each strip was carefully wrapped by hand around the circumference of each individual wire in a helical fashion, using a minimum of 50 percent overlap of each tape over itself. Two tapes were used for each wire, with the second tape being spiraled in the opposite direction of rotation from the first tape to simulate typical commercial wire constructions. The wrapped wires were each heat sealed in an oven at 350° C. for 1.5 min. The seven wires were secured together at 50 mm intervals with ties or lacing tape ((Mil-T-43435) Type-1). Approximately 0.6 cm of insulation was removed from the end of each wire for attachment to terminal strips. The center wire was attached to a terminal strip carrying a negative charge. The remaining wires were attached to the negative terminal strip or another terminal strip carrying a positive charge, in alternating fashion so that adjacent wires had opposite charges. The test unit consisted of a Miller Welding Generator (SCR-Heliwelder/300 Amperes AC/DC) operated from a single-phase, 60 Hz, AC power supply. The positive and negative electrodes of the generator were connected to corresponding posts in the junction box. The bare conductors of the wires gathered at the respective terminal strips were frayed and placed in contact with each other. Light contact was made between the frayed conductors of each wire in the harness. Alternatively, cutting the wires flush at the test end and dipping them in copper dust or graphite will energize the harness in the same manner as fraying the ends. The harness was mounted on a non-conducting holder and positioned 1–2 cm away from an aluminum plate. Stands holding the specimen and the aluminum plate were enclosed in a chamber with a polymethyl methacrylate door to contain sparks, fumes, and smoke which was vented into a hood during testing.

In operation, the power source selector of the test unit (or, the AC/DC switch) was set to the DC position and the amount of current was set to 200 amps. The polarity switch was set in the reverse position, with the electrode secondary terminal being the positive polarity and the work secondary terminal being the negative polarity Note that the polarity switch has no effect when the AC/DC switch is in the AC position. The contactor and current switches were in the "remote" position In the initial application of power, the main power switch was connected to energize the specimen This was accomplished by placing the current switch in the "panel" position. The contactor switch was placed in the "standard" position, and the test specimen was energized with the selected amount of current Electrical arcing and sparking always occurred for all test specimens in the first application of power (or "strike").

Power was next removed from the system by placing the manual switch in the "remote" position. The test specimen was then reenergized using the switch with low current and low voltage (open line voltage of 80 volts). After this second application of power (or "restrike"), the main power was deenergized and the old harness was replaced with another harness containing untested specimens.

The criteria to evaluate whether test specimens exhibit arc tracking is subjective; however, certain phenomena are clearly indicative of arc tracking behavior It is well accepted that a specimen that arc tracks will propagate damage along the insulation of the damaged wire and sometimes to the insulation of surrounding wires with considerable sparking, smoke, and possibly flaming. An arc track resistant wire either exhibits no detrimental activity or initially exhibits sparking, but without further appreciable degrading of the insulation. Arc propagation was described for test specimens as "yes" (failed the test) or "no" (passed the test). In compositions for which arc track propagation is indicated by an asterisk, the tested samples were judged to be sufficiently arc track resistant as evidenced by the average value of arc propagation. It is important to note that for each Example or Comparative Example, several samples of the particular composition were tested in both the arc track screening test and the wire harness test. The data presented in the Tables are average data for the samples tested for the particular composition.

In the wire harness test, all compositions tested exhibited a massive arc due to the initial strike. On restrike, the samples of the Examples and Comparative Examples were classified according to degree of any arcing indicated. Thus, compositions exhibiting either no detrimental event or a spitting arc that quickly subsided were considered to have passed the test. Compositions that either propagated the arc or exhibited flame failed the test.

Another test conducted on the samples was the oven aging test. In one set of trials according to this test, a specimen formed as film was hung in an air circulating oven at 230° C. and closely monitored until a manual crease was enough to cause brittle fracture. The time (in days) until brittleness occurred was recorded. In another set of trials according to this test, the same procedure was followed except that the temperature within the oven was maintained at 180° C. For both oven age tests, samples that were not brittle after 21 days of testing were considered acceptable and the tests were stopped.

While the tests conducted according to the present invention illustrate the claimed copolyimides as coated films, it is readily apparent to one skilled in the art that the compositions may additionally be made into laminates and other articles.

To prepare an arc track resistant copolyimide film according to the present invention, an aromatic tetracarboxylic acid (or a functional derivative thereof) is reacted with at least one aromatic diamine and at least one aliphatic diamine, where the aliphatic diamine is present from 5 to 20 percent by weight based on the reactants, to form a copolyamide acid. The copolyamide acid may be converted by commonly practiced techniques to form the arc track resistant copolyimide film. The copolyimide film may be applied to a substrate by contacting multiple layers of the copolyimide film with multiple layers of a fluoropolymer film under conditions of heat and pressure sufficient to produce a copolyimide laminate (with the fluoropolymer film adhered to the copolyimide film). The laminate is applied to a substrate and heated to adhere the laminate to itself.

The copolyimide as coated film or laminate may be applied to the outside periphery of conductive articles such as wire and cable. These articles may be assembled in a parallel configuration and secured in a wire harness.

The subject invention will be more fully appreciated with reference to the examples that follow:

EXAMPLES

In the tables, Examples are designated by "E" and Comparative Examples are designated by "CE".

EXAMPLE 1

To a 1 liter resin kettle, dried and under nitrogen purge, was added 586 grams of N,N-dimethylacetamide (DMAC) as solvent. With mechanical stirring of the solvent, 35 g (0.175 mol) of 4,4'-diaminodiphenylether (oxydianiline or ODA) and 8.7 g (0.075 mol) of 1,6-diaminohexane (DAH) was added. When the solution was homogeneous, 50 g (0.228 mol) of pyromellitic dianhydride (PMDA) was added as a solid powder. Within a few minutes reaction began as indicated by an exotherm increasing the solution temperature from ambient to 45-50 degrees C. A flocculent precipitate was initially formed when reaction began but dispersed to a homogeneous solution after approximately 15 min. Incremental additions of PMDA were then made to a total of 54.35 g (0.248 mol) over the next hour. Increments were 1 g each and then reduced as viscosity increased. Additions were stopped when the viscosity reached 170 poise. The viscosity of these solutions containing approximately 15 percent solids should be greater than 1 Pa.s (100 poise) to obtain good films when cast onto glass and subsequently cured in a support frame in an oven.

This polyamic acid solution was then cast onto glass plates (30 cm × 30 cm) using a solution approximately 0.2-0.25 mm (8-10 mil). The plates were then placed on a hot plate with even surface temperature of 90°-95° C. for 30 min. The dried film of approximately 25 cm × 25 cm was then placed in a 25 cm square frame with the edges of the film held with pins. The frame was then placed in an oven where further drying and thermal conversion to the polyimide occurred. A representative oven cycle was: initial temperature 95° C., ramping temperature at 10° C./min to 275° C. maximum, holding at 275° C. for 10 min and then ramping down at the same rate. A good sample of film approximately 23 cm × 23 cm and 0.025-0.050 mm (1-2 mil) thickness was obtained for testing.

The sample of this Example contained 9.0 weight percent DAH. It was sufficiently arc track resistant according to the arc track screening test and the wire harness test.

EXAMPLES 2-4

These Examples are directed to a variety of compositions prepared according to the procedures recited in Example 1 but containing differing mole ratios of PMDA/ODA/DAH. Having reference to Table 1, it can be seen as the level of DAH increased from 0.2 to 0.5 mol percent (6.0-15.7 weight percent), the oven aging time at 230° C. decreased. The compositions of Examples 2 and 3 were sufficiently arc track resistant according to the arc track screening test and the wire harness test. The composition of Example 4 helps to define the minimum level of aliphatic diamine for which compositions are considered arc track resistant in that it showed arc track resistance in the screen test but not the wire harness test. Thus while this composition may be considered arc track resistant, it approaches the lower limit of aliphatic diamine considered useful to impart arc track resistant properties.

COMPARATIVE EXAMPLE 1

The procedure detailed in Example 1 was followed, except that to a stirred resin kettle containing 586 g of DMAC was added 48 g (0.24 mol) of ODA. When dissolved and homogeneous, a total of 53.5 g (0.244 mol) of pyromellitic dianhydride was added to obtain a viscosity of 120 poise.

The composition of this Comparative Example which contains a molar ratio of 1 mol PMDA, 1 mol ODA, and no aliphatic diamine did not demonstrate arc track resistance. In particular, this composition failed the arc track screening test (using both a coating on a steel coupon and a thin film) and the wire harness test. However, the presence of the aromatic diamine in the composition contributed to its heat aging resistance.

COMPARATIVE EXAMPLE 2

The procedure detailed in Example 1 was followed, except that to a stirred resin kettle containing 293 g of DMAC was added 12.0 g (0.0625 mol) of ODA and 12.5 g (0.0625 mol) of 1,12-diaminododecane (DDD). When homogeneous, a total of 26.5 g (0.121 mol) of pyromellitic dianhydride (PMDA) was added to reach a viscosity of 155 poise.

This composition contained 0.5 mole ratio (or 24 weight percent) of the aliphatic diamine DDD. The composition was not processible into film, and thus no data in the oven aging tests were taken. This demonstrates that at levels of aliphatic diamine above the claimed range of the inventive composition, thermal aging stability properties of the composition are compromised. Note that this composition did not propagate an induced arc in the arc track screening test. However, compositions according to the invention must additionally exhibit good thermal properties.

COMPARATIVE EXAMPLE 3

A composition was prepared according to the procedures outlined in Example 1 and containing a mole ratio of PMDA/ODA/DAH of 1/0.85/0.15 (or, 4.4 weight percent of DAH). The composition while exhibiting good thermal aging stability was not arc track resistant. This Comparative Example demonstrates that at levels of aliphatic diamine below the claimed range of the inventive composition, arc track resistant properties are compromised.

COMPARATIVE EXAMPLE 4

A composition was prepared according to the procedures outlined in Example 1 and containing a mole ratio of PMDA/ODA/DAH of 1.0.95/0.05 (or, 1.0 weight percent of DAH). The composition was not arc track resistant. This Comparative Example also demonstrates that at levels of aliphatic diamine below the claimed range of the inventive composition, arc track resistant properties are compromised.

EXAMPLE 5

The procedure detailed in Example 1 was followed, except that to a stirred resin kettle containing 586 g of DMAC was added 24.0 g (0.125 mol) of ODA and 14.5 g (0.125 mol) of 1,5-diamino 2-methylpentane (DAi$_H$). When the solution was homogeneous, a total of 52.1 g (0.238 mol) of pyromellitic dianhydride (PMDA) was added to reach a final viscosity of 164 poise.

The composition of this Example contained a mole ratio of PMDA/ODA/DAiH of 1/0.5/0.5 (or, 15. 7 weight percent of DAiH). The composition was arc track resistant.

EXAMPLE 6

The composition of Example 5 was prepared except that it contained a mole ratio of PMDA/ODA/DAiH of 1.0/0.75/0.25 (or, 7.5 weight percent DAiH). The composition passed the arc track screening test.

COMPARATIVE EXAMPLES 5-6

These Comparative Examples are directed to compositions prepared according to the procedure recited in Example 1 but having different mole ratios of PMDA/ODA/DAiH. Having reference to Table 1, it can again be seen that at low levels of aliphatic diamine (0.05-0.15 mole percent, or 1.0-4.4 weight percent of DAiH) arc tracking is propagated.

EXAMPLES 7-8

The procedures detailed in Example 1 were followed, and compositions containing PMDA, ODA, and 1,5-diaminopentane (DAP) were prepared. These compositions both display arc track resistance and acceptable heat aging times.

EXAMPLES 9-10

The procedures detailed in Example 1 were followed, and compositions containing PMDA, ODA, and 1,4-diaminobutane (DAB) were prepared. These compositions exhibited arc track resistance and acceptable heat aging times.

EXAMPLE 11

The procedures detailed in Example 1 were followed, and compositions containing 3,3',4,4'-biphenyltetracarboxylic dianhydride (BPDA), ODA, and DAH in molar ratios of 1/0.6/0.4 (or, 10.1 weight percent of DAH) were prepared. This composition exhibited arc track resistance.

Having reference to Table II, additional comparative compositions are examined. Samples of these compositions were subjected to the wire harness test, but not the arc track screening test. These compositions are outlined and discussed in the following Comparative Examples:

COMPARATIVE EXAMPLE 7

This composition contains Kapton® H film commercially available from E. I. du Pont de Nemours and Company, which has been dipped in a Teflon® FEP 9519 fluoropolymer dispersion and coalesced at 400° C. This composition exhibited arc tracking behavior. Thus, compositions containing the base polyimide alone (together with a fluoropolymer as an adhesive) are not arc track resistant.

COMPARATIVE EXAMPLE 8

This composition contains 3,3',4,4'-benzophenone tetracarboxylic dianhydride (BTDA), and ODA, in mole ratios of 1/1. It was prepared according to procedures readily understood to those skilled in the art and analogous to the procedure recited in Example 1. The composition was not arc track resistant.

COMPARATIVE EXAMPLE 9

This composition contains Ultem® film, commercially available from the General Electric Company. The composition is an aromatic polyetherimide film. The composition was not arc track resistant.

Having reference to Table III, various mechanical properties were measured for the compositions of Comparative Example 1, Example 1, and Example 3 according to the indicated procedures. The data in Table III are from samples of insulated wire or insulation stripped from wire. The LOI was measured by a non-standard method in that it was run on insulated wire samples under the routine methods in ASTM-D-2863. These data demonstrate that compositions according to the invention exhibit desirable physical properties and other characteristics.

In the scrape abrasion test, a General Electric Repeated Scrape Abrasion Tester, modified with a 0.025 inch diameter steel pin as an abrasion surface held at 90° to the axis of the wire specimen, was used. A specimen of finished wire with about ½ inch stripped from one end was clamped in position on the block. Suitably grooved blocks were available for various diameter wires. The electrical circuit, designed to cut off the apparatus at failure, was connected to the conductor on the stripped end. The desired load for the material to be tested was added to the arm and lowered on the specimen. The start button was engaged. The eccentric action of the arm moved the blade across the surface of the finished wire. When the insulation was abraded through to the conductor the tester shut off. Each cycle was registered on a counter. Four to eight determinations were obtained on wire rotated 90° after each determination. This allowed for possible variations in concentricity of the insulation. Tests were made at least 1 inch apart. Only four readings may be taken if necessary. Care should be taken to make sure the insulations clamped to the support block are abraded.

Many changes and modifications in the above described invention can of course be carried out without departing from the scope thereof.

TABLE I

ARC TRACKING TESTING AND HEAT AGING OF MODIFIED POLYIMIDE

| POLYIMIDE COMPOSITION: | E1 PMDA/ODA/ DAH | E2 PMDA/ODA/ DAH | E3 PMDA/ODA/ DAH | E4 PMDA/ODA/ DAH | E5 PMDA/ ODA/ DAiH | E6 PMDA/ ODA/ DAiH |
|---|---|---|---|---|---|---|
| MOLE RATIO: dianhydride/diamine(1)/diamine(2) | 1/.7/.3 | 1/.5/.5 | 1/.75/.25 | 1/.8/.2 | 1/.5/.5 | 1/.75/.25 |
| Weight % Aliphatic Diamine in Reactants | 9.0 | 15.7 | 7.5 | 6.0 | 15.7 | 7.5 |
| OVEN AGING OF 0.025-0.050 mm FILMS: | | | | | | |
| Days to Brittleness/180 C. | >21 | >21 | >21 | >21 | — | >21 |
| Days to Brittleness/230 C. | 4 | 2 | 7 | 10 | — | 7 |
| ARC-TRACK "SCREENING" TEST: As 0.025-0.050 mm coating on steel coupon: | | | | | | |
| Breaker trip (yes/no): | — | no | no | — | no | no |
| Number of times sample energized: | — | 2 | 2 | — | 1 | 2 |
| Tracking/damage distance (cm): | — | 0.2 | 1.2 | — | 0.3 | 2.6 |
| Arc Propagation (yes/no): | — | no | no | — | no | no |
| As 0.025-0.050 mm thick film (2.5 cm × 17.5 cm strip): | | | | | | |
| Breaker trip (yes/no): | yes/no | no | yes/no | no | no | no |
| Number of times sample energized: | 2 | 2 | 2 | 2 | 2 | 2 |
| Tracking/damage distance (cm): | 2.3 | 1.0 | 3.8 | 0.2 | 0.2 | 3.2 |
| Arc Propagation (yes/no): | no | no | no | no | no | yes |
| WIRE HARNESS TEST: Initial strike (comments): | | | | | | |
| Arc: | yes | yes | yes | yes | — | yes |
| Arc propagation: | * | * | yes | yes | — | yes |
| Restrike: | * | no | * | yes | | |
| Arc propagation (yes/no): | | | | | — | * |

| POLYIMIDE COMPOSITION | E7 PMDA/ ODA/ DAP | E8 PMDA ODA/ DAP | E9 PMDA/ODA/ DAB | E10 PMDA/ODA/ DAB | E11 BPDA/ODA/ DAH | CE1 PMDA/ ODA | CE2 PMDA/ ODA/ DDD |
|---|---|---|---|---|---|---|---|
| MOLE RATIO: dianhydride/diamine(1)/diamine(2) | 1/.75/.25 | 1/.7/.3 | 1/.75/.25 | 1/.7/.3 | 1/.6/.4 | 1/1 | 1/.5/.5 |
| Weight % Aliphatic Diamine in Reactants | 6.5 | 8.0 | 5.7 | 6.8 | 10.1 | 0 | 24 |
| OVEN AGING OF 0.025-0.050 mm FILMS: | | | | | | | |
| Days to Brittleness/180 C. | — | — | — | — | — | >21 | — |
| Days to Brittleness/230 C. | 20 | 10 | >21 | 17 | — | >21 | — |
| ARC-TRACK "SCREENING" TEST: As 0.025-0.050 mm coating on steel coupon: | | | | | | | |
| Breaker trip (yes/no): | — | — | — | — | no | yes | no |
| Number of times sample energized: | — | — | — | — | 1 | 1 | 1 |
| Tracking/damage distance (cm): | — | — | — | — | 1 | 6.1 | 0.1 |
| Arc Propagation (yes/no): | — | — | — | — | no | yes | no |
| As 0.025-0.050 mm thick film (2.5 cm × 17.5 cm strip): | | | | | | | |
| Breaker trip (yes/no): | no | no | yes | yes | no | yes | — |
| Number of times sample energized: | 2 | 1 | 1 | 2 | 1 | 1 | — |
| Tracking/damage distance (cm): | 0.5 | 0.5 | 4.1 | 5.1 | 3.4 | 5.9 | — |
| Arc Propagation (yes/no): | no | no | * | * | * | yes | — |
| WIRE HARNESS TEST: Initial strike (comments): | | | | | | | |
| Arc: | yes | yes | yes | yes | yes | yes | — |
| Arc propagation: | yes | yes | yes | yes | yes | yes | — |
| Restrike: | | | | | | | |
| Arc propagation (yes/no): | * | * | yes | * | * | yes | — |

| | CE3 PMDA/ | CE4 PMDA/ | CE5 | CE6 |
|---|---|---|---|---|

TABLE I-continued

ARC TRACKING TESTING AND HEAT AGING OF MODIFIED POLYIMIDE

| POLYIMIDE COMPOSITION: | ODA/DAH | ODA/DAH | PMDA/ODA/DAiH | PMDA/ODA/DAiH |
|---|---|---|---|---|
| MOLE RATIO: dianhydride/diamine(1)/diamine(2) | 1/.85/.15 | 1/.95/.05 | 1/.95/.05 | 1/.85/.15 |
| Weight % Aliphatic Diamine in Reactants | 4.4 | 1.0 | 1 | 4.4 |
| OVEN AGING OF 0.025–0.050 mm FILMS: | | | | |
| Days to Brittleness/180 C. | >21 | — | — | >21 |
| Days to Brittleness/230 C. | >21 | — | — | >21 |
| ARC-TRACK "SCREENING" TEST: As 0.025–0.050 mm coating on steel coupon: | | | | |
| Breaker trip (yes/no): | yes | yes | yes | yes |
| Number of times sample energized: | 1 | 1 | 1 | 1 |
| Tracking/damage distance (cm): | 4.4 | 5.2 | 5.1 | 7.0 |
| Arc Propagation (yes/no): | yes | yes | yes | yes |
| As 0.025–0.050 mm film (2.5 cm × 17.5 cm strip): | | | | |
| Breaker trip (yes/no): | yes | yes | yes | yes |
| Number of times sample energized: | 1 | 1 | 1 | 1 |
| Tracking/damage distance (cm): | 7.3 | 5.4 | 1.6 | 5.4 |
| Arc Propagation (yes/no): | yes | yes | yes | yes |
| WIRE HARNESS TEST: Initial strike (comments): | | | | |
| Arc: | — | — | — | — |
| Arc propagation: | | | | |
| Restrike: | | | | |
| Arc propagation (yes/no): | — | — | — | — |

TABLE II

EXAMPLES OF OTHER MATERIALS IN ARC TRACKING TESTS

| FILM COMPOSITION: | CE7 PMDA/ODA | CE8 BTDA/ODA | CE9 ULTEM ® FILM |
|---|---|---|---|
| WIRE HARNESS TEST: | | | |
| Initial strike (comments): | Arc is continuous during initial strike. | Arc | Arc |
| Restrike (comments): | Arc/fire. | Arc/fire. | Arc/fire. |
| Arc propagation (yes/no): | yes | yes | yes |

TABLE III

| POLYIMIDE COMPOSITION | CE1 PMDA/ODA | E1 PMDA/ODA/DAH/ | E3 PMDA/ODA/DAH/ |
|---|---|---|---|
| MOLE RATIO: | | | |
| dianhydride/diamine(1)/diamine(2) | 1/1 | 1/.7/.3 | 1/.75/.25 |
| Weight % Aliphatic Diamine in Reactants | 0 | 9.0 | 7.5 |
| Life Cycle: (MIL 22759/34) | | | |
| 168 hrs/150° C. | Pass | Pass | Pass |
| 180° C. | Pass | Pass | Pass |
| 200° C. | Pass | Pass | Pass |
| 500 hrs/150° C. | Pass | Pass | Pass |
| 180° C. | Pass | Pass | Pass |
| 200° C. | Pass | Pass | Pass |
| 1000 hrs/150° C. | Pass | Pass | Pass |
| 180° C. | Pass | Pass | Pass |
| 200° C. | Pass | Fail | Fail |
| Tensile Strength: (PSI) As is (ASTM-D-3032) | 22878 | 14595 | 14656 |
| 500 hrs/150° C. | — | 13737 | 14603 |

TABLE III-continued

| POLYIMIDE COMPOSITION | CE1 PMDA/ ODA | E1 PMDA/ ODA/ DAH/ | E3 PMDA/ ODA/ DAH/ |
|---|---|---|---|
| 180° C. | — | 13270 | 13049 |
| 200° C. | — | 11861 | 11874 |
| 1000 hrs/150° C. | — | 13827 | 16130 |
| 180° C. | — | 12526 | 12692 |
| 200° C. | — | brittle | 9523 |
| Elongation at break (%) As is | 84 | 164 | 142 |
| 500 hrs/150° C. | — | 109 | 129 |
| 180° C. | — | 115 | 112 |
| 200° C. | — | 21 | 79 |
| 1000 hrs/150° C. | — | 112 | 16130 |
| 180° C. | — | 84 | 145 |
| 200° C. | — | brittle | 101 |
| Dynamic Cut-Through: (Lbs) | | | |
| Room Temp. | 65 | 27 | 34 |
| (ASTM-D-3032) | 42 | 15 | 17 |
| Scrape Abrasion (cycles) | 28350 | 6050 | 5340 |
| Fluid Immersion: | | | |
| Cleaner (43616) | Pass | Pass | Pass |
| (50° C./20 hrs) | | | |
| Lube Oil (175° C./7 hrs) | Pass | Pass | Pass |
| Turbine Fuel (25° C./20 hrs) | Pass | Pass | Pass |
| Isopropyl Alcohol (25° C./20 hrs) | Pass | Pass | Pass |
| Hydralic Fluid (50° C./20 hrs) | Pass | Pass | Pass |
| (MIL-W-81381/7) | | | |
| Vertical Flame: | | | |
| Burn Time (sec) | 0 | 0 | 0 |
| Cotton Ignition | No | No | No |
| Burn Distance (in) | 0.34 | 0.40 | 0.38 |
| (ASTM-D-3032) | | | |
| Smoke Density (NBS Smoke Chamber): | | | |
| Non-Flaming (Dm) | 0 | 0 | 0 |
| Flaming (Dm) | 5 | 27 | 14 |
| (ASTM-F-814) | | | |
| Limiting Oxygen Index (LOI): | | | |
| % Oxygen | 80.5 | 61.5 | 66.9 |
| (ASTM-D-2863) | | | |
| (Tests conducted on wire samples) | | | |
| MOLE RATIO: | | | |
| dianhydride/diamine(1)/ diamine(2) | 1/1 | 1/.7/.3 | 1/.75/.25 |
| Weight % Aliphatic Diamine in Reactants | 0 | 9.0 | 7.5 |
| Life Cycle: (MIL 22759/34) | | | |
| 168 hrs/150° C. | Pass | Pass | Pass |
| 180° C. | Pass | Pass | Pass |
| 200° C. | Pass | Pass | Pass |
| 500 hrs/150° C. | Pass | Pass | Pass |
| 180° C. | Pass | Pass | Pass |
| 200° C. | Pass | Pass | Pass |
| 1000 hrs/150° C. | Pass | Pass | Pass |
| 180° C. | Pass | Pass | Pass |
| 200° C. | Pass | Fail | Fail |
| Tensile Strength: (PSI) As is | 22878 | 14595 | 14656 |
| (ASTM-D-3032) | | | |
| 500 hrs/150° C. | — | 13737 | 14603 |
| 180° C. | — | 13270 | 13049 |
| 200° C. | — | 11861 | 11874 |
| 1000 hrs/150° C. | — | 13827 | 16130 |
| 180° C. | — | 12526 | 12692 |
| 200° C. | — | brittle | 9523 |
| Elongation at break (%) As is | 84 | 164 | 142 |
| 500 hrs/150° C. | — | 109 | 129 |
| 180° C. | — | 115 | 112 |
| 200° C. | — | 21 | 79 |
| 1000 hrs/150° C. | — | 112 | 16130 |
| 180° C. | — | 84 | 145 |
| 200° C. | — | brittle | 101 |

I claim:

1. In an improved copolyimide film of:
   (a) an aromatic tetracarboxylic acid; and
   (b) at least one aromatic diamine; the improvement comprising the addition of
   (c) at least one aliphatic diamine;

wherein said aliphatic diamine is present from 5 to 20 percent by weight based on components (a), (b), and (c), and wherein said copolyimide film is arc track resistant.

2. The film of claim 1 wherein component (a) is pyromellitic acid.

3. The film of claim 1 wherein component (b) is 4,4'-diaminodiphenylether.

4. The film of claim 1 wherein component (c) is selected from the group consisting of linear or branched aliphatic and cycloaliphatic diamines having from 4 to 13 carbon atoms.

5. The film of claim 4 wherein component (c) is present in an amount of from 6 to 15 percent by weight based on components (a), (b), and (c).

6. The film of claim 4 wherein component (c) is present in an amount of from 7 to 10 percent by weight based on components (a), (b), and (c).

7. The film of claim 1 wherein component (c) is selected from the group consisting of 1,6-diaminohexane, 1,12-diaminododecane, 1,5-diamino-2-methylpentane, 1,5-diaminopentane and 1,4-diaminobutane.

8. In an improved copolyimide film of:
   (a) pyromellitic acid; and
   (b) 4,4'-diaminodiphenylether; the improvement comprising the addition of
   (c) 1,6-diaminohexane;
   wherein said 1,6-diaminohexane is present from 5 to 20 percent by weight based on components (a), (b), and (c), and wherein said copolyimide film is arc track resistant.

9. The film of claim 8 wherein component (c) is present in an amount of from 7.5 to 9 percent based on the weight of components (a), (b), and (c).

10. A process for the preparation of an arc track resistant copolyimide film, comprising:
    (a) reacting an aromatic tetracarboxylic acid with at least one aromatic diamine and at least one aliphatic diamine, said aliphatic diamine being present from 5 to 20 percent by weight based on the reactants, to form a copolyamide acid; and
    (b) converting said copolyamide acid to form an arc track resistant copolyimide film.

11. In an improved copolyimide film of:
    (a) 3,3',4,4'-biphenyltetracarboxylic acid; and
    (b) 4,4'-diaminodiphenylether; the improvement comprising the addition of
    (c) at least one aliphatic diamine;
    wherein said aliphatic diamine is present from 5 to 20 percent by weight based on components (a), (b), and (c), and wherein said copolyimide film is arc track resistant.

* * * * *